(12) United States Patent
Yatsugi et al.

(10) Patent No.: US 10,822,260 B2
(45) Date of Patent: Nov. 3, 2020

(54) ORGANIC WASTEWATER TREATMENT METHOD AND ORGANIC WASTEWATER TREATMENT DEVICE

(71) Applicant: Kubota Corporation, Osaka-shi, Osaka (JP)

(72) Inventors: Soichiro Yatsugi, Amagasaki (JP); Kuniyasu Suzuki, Amagasaki (JP); Hitoshi Yanase, Amagasaki (JP); Yukako Ishihara, Tokyo (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/593,637

(22) Filed: Oct. 4, 2019

(65) Prior Publication Data

US 2020/0031697 A1    Jan. 30, 2020

Related U.S. Application Data

(63) Continuation of application No. PCT/JP2018/013695, filed on Mar. 30, 2018.

(30) Foreign Application Priority Data

Apr. 4, 2017  (JP) ................................ 2017-074763

(51) Int. Cl.
*C02F 3/30* (2006.01)
*C02F 3/00* (2006.01)
(Continued)

(52) U.S. Cl.
CPC .............. *C02F 3/303* (2013.01); *C02F 3/006* (2013.01); *C02F 3/1215* (2013.01);
(Continued)

(58) Field of Classification Search
CPC ........ C02F 3/303; C02F 3/006; C02F 3/1215; C02F 3/1273; C02F 3/20; C02F 3/223;
(Continued)

(56) References Cited

U.S. PATENT DOCUMENTS

| | | | |
|---|---|---|---|
| 7,147,777 B1 * | 12/2006 | Porteous | ............... C02F 3/1268 210/605 |
| 2008/0087602 A1 * | 4/2008 | Kuzma | ................... C02F 3/006 210/605 |

(Continued)

FOREIGN PATENT DOCUMENTS

| | | |
|---|---|---|
| JP | 2016-182551 | 10/1916 |
| JP | 2000-140886 | 5/2000 |

(Continued)

OTHER PUBLICATIONS

International Search Report from International Application No. PCT/JP2018/013695 dated Mar. 22, 2018.

*Primary Examiner* — Fred Prince
(74) *Attorney, Agent, or Firm* — Beyer Law Group LLP (57) ABSTRACT

An organic wastewater treatment device includes a biological treatment tank in which biological treatment units are connected in series along a flow of organic wastewater. Each biological treatment unit has a pair of an anoxic tank disposed on an upstream side, and an aerobic tank disposed on a downstream side in which a membrane separation device is immersed in activated sludge. The activated sludge returns from a most downstream-side aerobic tank to a most upstream-side anoxic tank through a sludge return path. Whether to stop an operating membrane separation device and whether to start a stopped membrane separation device are determined for each biological treatment unit based on at least one of an inflow amount of the organic wastewater, a tank water level, a transmembrane pressure difference of each membrane separation device, a T-N concentration of the treated water, and an NH3-N concentration of the treated water as an index.

9 Claims, 8 Drawing Sheets

(51) Int. Cl.
*C02F 3/12* (2006.01)
*C02F 3/20* (2006.01)
*C02F 3/22* (2006.01)

(52) U.S. Cl.
CPC .............. *C02F 3/1273* (2013.01); *C02F 3/20* (2013.01); *C02F 3/223* (2013.01); *C02F 3/305* (2013.01); *C02F 2209/03* (2013.01); *C02F 2209/14* (2013.01); *C02F 2209/42* (2013.01); *C02F 2301/08* (2013.01); *C02F 2303/16* (2013.01)

(58) Field of Classification Search
CPC .. C02F 3/305; C02F 2209/03; C02F 2209/14; C02F 2209/42; C02F 2301/08; C02F 2303/16; C02F 2209/005; C02F 3/1257; C02F 2301/043; C02F 2209/40; C02F 2209/16; C02F 3/1221; C02F 3/302; C02F 3/121; Y02W 10/15
USPC ........ 210/605, 615, 631, 906, 259, 623, 903
See application file for complete search history.

(56) References Cited

U.S. PATENT DOCUMENTS

2009/0206028 A1* 8/2009 Jiang .................... C12M 47/18
              210/603
2012/0234754 A1* 9/2012 Yatsugi ................ C02F 3/1273
              210/620

FOREIGN PATENT DOCUMENTS

| JP | 2003-290607 | 10/2003 |
| JP | 2004-148146 | 5/2004 |
| JP | 2007-222814 | 9/2007 |
| JP | 4374885 | 12/2009 |
| JP | 2010-089079 | 4/2010 |
| JP | 2010-137185 | 6/2010 |
| JP | 2015-097976 | 5/2015 |

* cited by examiner

ORGANIC WASTEWATER TREATMENT METHOD AND ORGANIC WASTEWATER TREATMENT DEVICE

CLAIM OF PRIORITY

This application is a Continuation of International Patent Application No. PCT/JP2018/013695, filed on Mar. 30, 2018, which claims priority to Japanese Patent Application No. 2017-074763, filed on Apr. 4, 2017, each of which is hereby incorporated by reference.

BACKGROUND OF THE INVENTION

1. Field of the Invention

The present invention relates to an organic wastewater treatment method and an organic wastewater treatment device.

2. Description of the Related Art

Japanese Patent Application Laid-Open No. 2000-140886 discloses a nitrogen-containing wastewater treatment facility which treats nitrogen-containing wastewater using activated sludge with a nitrogen removal rate of 90% or more, and which can also be made compact.

The nitrogen-containing wastewater treatment facility includes a plurality of anaerobic tanks and aerobic tanks connected in series alternately in the order of anaerobic tank and aerobic tank, a supply path for supplying the nitrogen-containing wastewater to a first stage anaerobic tank and to at least one anaerobic tank after the second stage, while the last stage aerobic tank includes an immersion type separation device for separating the activated sludge so as to obtain treated liquid, and a flow path to return liquid containing the activated sludge from the last stage aerobic tank to the first stage anaerobic tank.

Japanese Patent No. 4374885 discloses a membrane separation apparatus which is capable of performing an advanced treatment with a single treatment tank. The membrane separation apparatus includes an endless-type treatment tank for biologically treating water to be treated, a plurality of membrane units for membrane-separating the water to be treated, and a raw water tank for storing the water to be treated which is to be supplied to the treatment tank. A swirling flow of the water to be treated is formed in the treatment tank, and the plurality of membrane units are installed at intervals in the swirling flow in a flow direction thereof.

In the membrane separation apparatus, the raw water tank is provided on an inner side of the swirling flow, and the water to be treated is supplied from the raw water tank to the treatment tank in multiple stages along the flow direction of the swirling flow using a supply means.

Since the organic wastewater is supplied to the anaerobic treatment region formed adjacent to the aerobic treatment region in which each separation membrane is immersed, any of the above-described wastewater treatment facilities can realize a high denitrification performance in the anaerobic treatment region under a high BOD concentration.

BRIEF DESCRIPTION OF THE INVENTION

However, these documents do not disclose any countermeasures against fluctuations in an amount of the organic wastewater flowing into the above-mentioned wastewater treatment facility or fluctuations in a nitrogen content, or any effective membrane cleaning method which is required when fouling substances accumulate on the separation membrane so as to increase a transmembrane pressure difference. Thus, in this regard, the above-mentioned wastewater treatment facilities still have certain aspects to be improved.

Thus, an object of the present invention is to provide an organic wastewater treatment method and an organic wastewater treatment device which can efficiently perform biological treatment in accordance with the properties of nitrogen-containing organic wastewater.

In order to achieve the above-mentioned object, a first characteristic configuration of the organic wastewater treatment method according to the present invention is an organic wastewater treatment method for biologically treating nitrogen-containing organic wastewater in activated sludge in an organic wastewater treatment device. The organic wastewater treatment device includes (a) a biological treatment tank in which a plurality of biological treatment units are connected in series, each biological treatment unit having a pair of an anoxic tank disposed on an upstream side along a flow of the organic wastewater, and an aerobic tank disposed on a downstream side of the flow, a membrane separation device being immersed in activated sludge in the aerobic tank, and (b) a sludge return path for returning the activated sludge from the aerobic tank disposed on a most downstream side to the anoxic tank disposed on a most upstream side. The organic wastewater treatment method includes (i) dividing and supplying the organic wastewater to the anoxic tank of each biological treatment unit, (ii) biologically treating the organic wastewater by repeating a denitrification process in the anoxic tank and a nitrification process in the aerobic tank, (iii) discharging membrane-permeated liquid from the membrane separation device of each biological treatment unit as treated water, and (iv) determining for each biological treatment unit whether to stop the membrane separation device which is operating ("operating membrane separation device") or whether to start the membrane separation device which has been stopped ("stopped membrane separation device") based on at least one of an inflow amount of the organic wastewater, a tank water level, a transmembrane pressure difference of each membrane separation device, a T-N concentration of the treated water, and an $NH_3$—N concentration of the treated water as an index.

By determining whether to stop the operating membrane separation device or to start the stopped membrane separation device for each biological treatment unit based on a degree of load on the nitrification process and the denitrification process for the nitrogen-containing organic wastewater, it is possible to optimize a power required for an aeration device provided for the membrane separation device, thereby reducing the operating cost.

As an index for measuring the degree of load, at least one of the inflow amount of the organic wastewater, the tank water level, the transmembrane pressure difference of each membrane separation device, the T-N concentration of the treated water, and the $NH_3$—N concentration of the treated water can be used.

A second characteristic configuration of the organic wastewater treatment method provides, in addition to the first characteristic configuration described above, adjusting an injection amount of a flocculant injected into the activated sludge in the biological treatment tank based on an operating status of the membrane separation device.

When the membrane separation device is stopped in the biological treatment unit, an anaerobic condition in the corresponding aerobic tank is strengthened because the aeration device therein is stopped. If the activated sludge in this condition flows into the adjacent anoxic tank on the downstream side, a discharge of phosphorus from the activated sludge becomes more prominent due to the influence of the organic wastewater supplied to the anoxic tank.

This enhances an excessive intake of phosphorus by the activated sludge in the aerobic tank in which the membrane separation device is operating. Thus, even if the injection amount of the flocculant is reduced, the phosphorus is efficiently removed and it becomes possible to perform a high-efficiency process of removing phosphorus in addition to performing denitrification process.

According to a third characteristic configuration of the organic wastewater treatment method, in addition to the first or second characteristic configuration described above, when it is determined to stop one of the membrane separation devices, the membrane separation device subject to a stop is switched in every predetermined time period.

When the membrane separation device is stopped in accordance with the above-described index, and if a specific membrane separation device is stopped for a prolonged time period, there may be a risk of spoiling the sludge in the corresponding aerobic tank. However, even in such a case, by switching the membrane separation device subject to a stop in every predetermined time period, it is possible to appropriately perform biological treatment as a whole device without spoiling the sludge in a specific aerobic tank.

A fourth characteristic configuration of the organic wastewater treatment method provides, in addition to the above-mentioned third characteristic configuration, sequentially performing a membrane cleaning process for all of the membrane separation devices by injecting a cleaning liquid to the stopped membrane separation device from a secondary side thereof, wherein a membrane filtration flow rate for the membrane separations which have been cleaned is set equal to or smaller than that for the membrane separation devices which have not been cleaned until all of the membrane separation devices have been cleaned.

When such a situation occurs that a fouling substance is deposited on a separation membrane of the membrane separation device so as to clog the separation membrane, it becomes necessary to perform a membrane cleaning process using a cleaning liquid. Since the transmembrane pressure difference in the membrane separation device after performing the membrane cleaning process becomes smaller than that of other membrane separation devices, the membrane filtration flow rate of the cleaned membrane separation devices increases, which likely causes an earlier clogging in the cleaned separation devices.

Even in such a case, by sequentially performing the cleaning process on the other membrane separation devices using the cleaning liquid, and operating the membrane separation devices by setting a membrane filtration flow rate for the cleaned membrane separation devices equal to or smaller than that for the membrane separation devices which have not been cleaned until all of the membrane separation devices have been cleaned, it is possible to achieve a stable membrane filtration process as a whole.

According to a fifth characteristic configuration of the organic wastewater treatment method, in addition to any one of the first to fourth characteristic configurations described above, an upper end of an opening of an outflow port through which the activated sludge flows from the aerobic tank into the anoxic tank is submerged, and an inflow rate of the activated sludge is equal to or smaller than 0.5 m/sec.

In the aerobic tank in which the membrane separation device is immersed, as an upward flow is generated by air bubbles discharged from the aeration device, a concentration of dissolved oxygen becomes high in the vicinity of the water surface, and the concentration of dissolved oxygen gradually decreases from the water surface toward the bottom.

If activated sludge with a high concentration of dissolved oxygen in the vicinity of the water surface flows into the anoxic tank, there is a risk that the denitrification efficiency will decrease. However, by disposing the upper end of the opening of the outflow port at a submerged position, it is possible to suppress a decrease in the denitrification efficiency in the anoxic tank.

Moreover, by setting the inflow rate of the activated sludge at the opening of the outflow port equal to or smaller than 0.5 msec, it is possible to suppress a water level difference between the aerobic tank and the anoxic tank due to a pressure loss when the activated sludge passes through the opening, thereby improving uniformity in the aeration for the activated sludge in each aerobic tank.

A first characteristic configuration of a wastewater treatment device according to the present invention provides an organic wastewater treatment device for biologically treating nitrogen-containing organic wastewater in activated sludge. The organic wastewater treatment device includes (a) a biological treatment tank in which a plurality of biological treatment units are connected in series, each biological treatment unit having a pair of an anoxic tank disposed on an upstream side along a flow of the organic wastewater, and an aerobic tank disposed on a downstream side of the flow, a membrane separation device being immersed in activated sludge in the aerobic tank, (b) a sludge return path for returning the activated sludge from the aerobic tank disposed on a most downstream side to the anoxic tank disposed on a most upstream side; (c) a raw water supply path for dividing and supplying the organic wastewater to the anoxic tank of each biological treatment unit; (d) a treated water discharge path for discharging membrane-permeated liquid from the membrane separation device of each biological treatment unit as treated water; (e) a measurement device for measuring at least one of an inflow amount of the organic wastewater, a tank water level, a transmembrane pressure difference of each membrane separation device, a T-N concentration of the treated water, and an $NH_3$—N concentration of the treated water; and (f) a controller for determining for each biological treatment unit whether to stop the membrane separation device which is operating or whether to start the membrane separation device which has been stopped based on a value measured by the measurement device as an index.

Accordance to a second characteristic configuration of the organic wastewater treatment device includes, in addition to the first characteristic configuration described above, the controller is further configured to adjust an injection amount of a flocculant injected into the activated sludge in the biological treatment tank in accordance with an operating status of the membrane separation device.

According to a third characteristic configuration of the organic wastewater treatment device, in addition to the first or second characteristic configuration described above, when it is determined to stop a membrane separation device, the controller switches the membrane separation device subject to a stop in every predetermined time period.

According to a fourth characteristic configuration of the organic wastewater treatment device, in addition to any one of the first to third characteristic configuration described above, an upper end of an opening of an outflow port for sending the activated sludge from the aerobic tank toward the adjacent anoxic tank on a downstream side along the flow of the organic wastewater is positioned at or lower than 30 cm from a water surface of the aerobic tank.

When the membrane separation device immersed in the aerobic tank is stopped, the activated sludge starts settling down in the tank. However, if the upper end of the opening of the outflow port through which the activated sludge flows toward the anoxic tank is positioned at or lower than 30 cm from the water surface of the aerobic tank, it is possible to avoid such an undesirable condition that only supernatant liquid flows into the anoxic tank, whereby the activated sludge can be transferred to the anoxic tank even when the membrane separation device is stopped.

As described above, according to the present invention, it is possible to provide an organic wastewater treatment method and an organic wastewater treatment device which can efficiently perform biological treatment according to the properties of the nitrogen-containing organic wastewater.

DETAILED DESCRIPTION OF EMBODIMENTS OF THE INVENTION

Figure 1A:
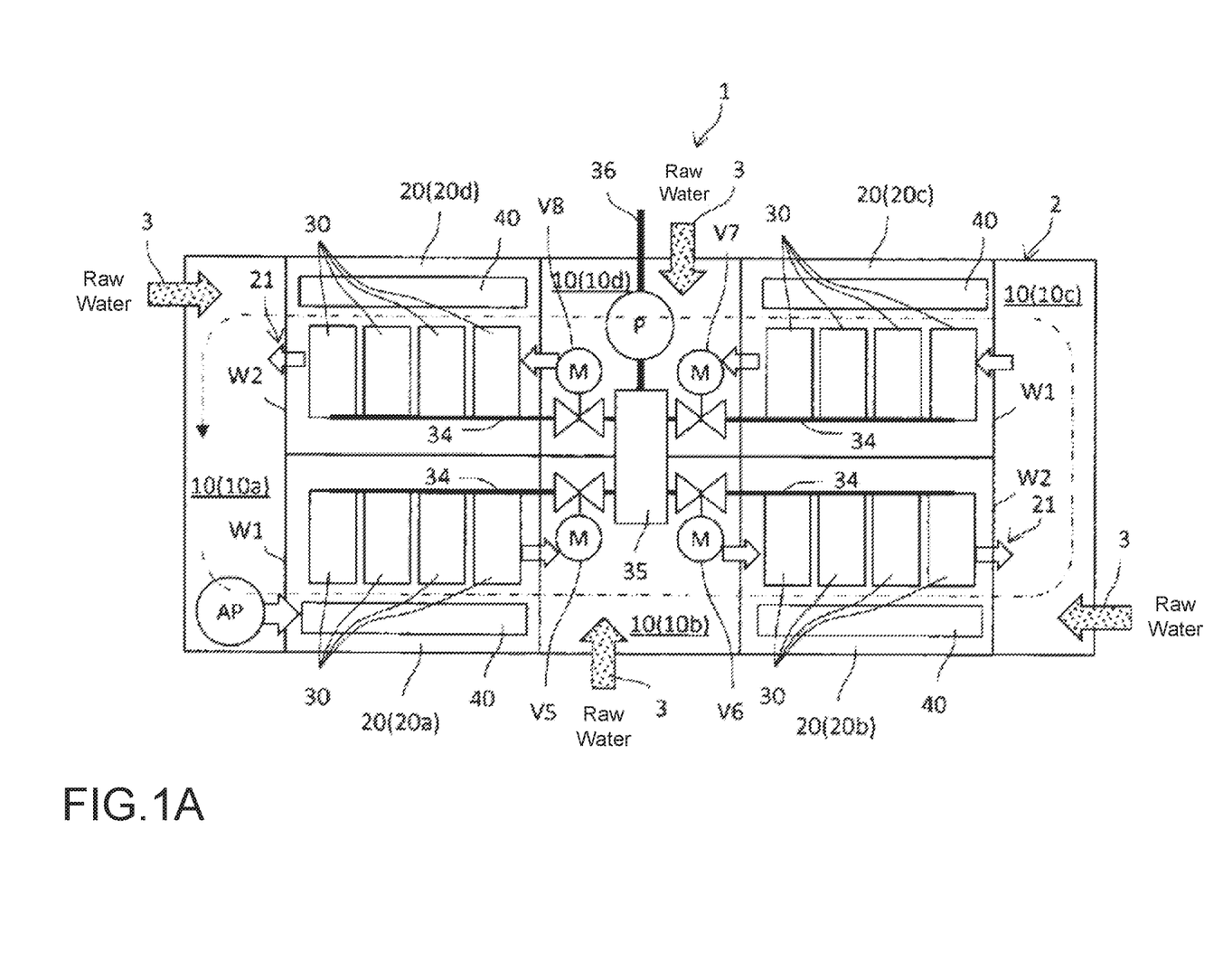
FIG. 1A is an explanatory diagram illustrating a plan view of a wastewater treatment device according to the present invention
Figure 1B:
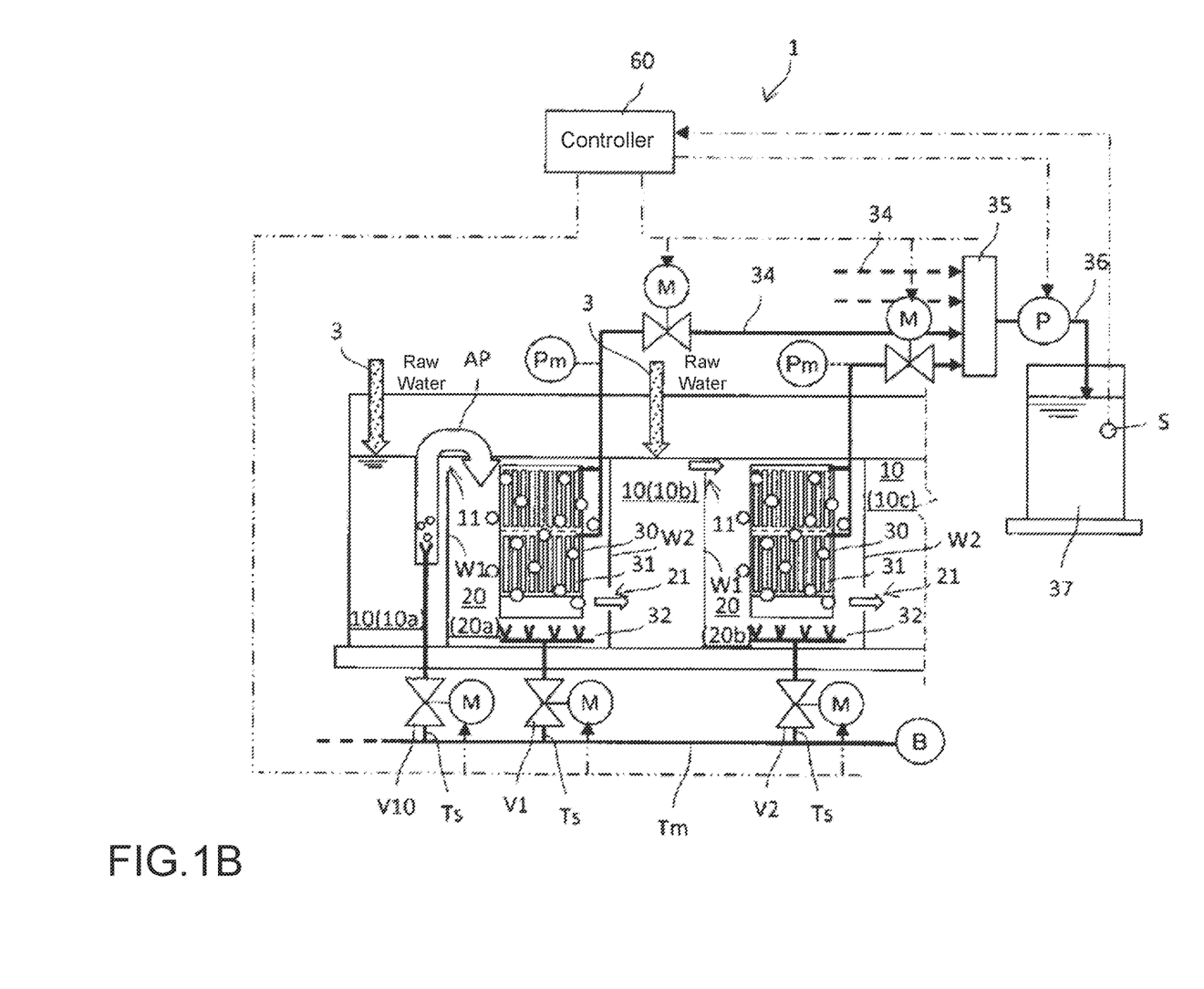
FIG. 1B is an explanatory sectional view of a part of the wastewater treatment device according to the present invention.

Hereinafter, embodiments of the organic wastewater treatment method and the organic wastewater treatment device according to the present invention will be described. As shown in FIG. 1A and FIG. 1B, the organic wastewater treatment device 1 is an organic wastewater treatment device for biologically treating nitrogen-containing organic wastewater in activated sludge so as to obtain treated water, and includes a biological treatment tank 2. A pair of an anoxic tank 10 and an aerobic tank 20 forms a biological treatment unit, and a plurality of biological treatment units (four pairs of biological treatment units in this embodiment) are connected in series and in an endless manner along a flow of the organic wastewater.

It should be noted that the plurality of biological treatment units may be formed by dividing a single biological treatment tank 2 into a plurality of sections, or the biological treatment tank 2 may also be constructed by arranging a plurality of pairs of the individual anoxic tank 10 and aerobic tank 20 along the flow of the organic wastewater.

In addition, the biological treatment tank 2 may be configured in a straight line, and a water channel or pipeline may be separately provided as a sludge return path for returning the activated sludge from the aerobic tank 20 disposed on the most downstream side to the anoxic tank 10 disposed on the most upstream side.

The organic wastewater, which is raw water, is divided into an approximately equal amount and supplied to each anoxic tank 10 through a raw water supply path 3, and after being treated by an anaerobic denitrification process in each anoxic tank 10, flows into the aerobic tank 20 on the downstream side to be aerobically treated therein. A membrane separation device 30 is immersed in each aerobic tank 20, and an auxiliary air diffuser 40 for the aerobic treatment is installed in the vicinity of the membrane separation device 30.

The anoxic tank 10 (10a) on the most upstream side is provided with an air lift pump AP. Air bubbles is supplied from a blower B to an air lift pipe through a valve V10 so as to generate an upward flow in the air lift pipe, by which the organic wastewater is sent to the aerobic tank 20 (20a) on the downstream side along with the activated sludge. After that, the organic wastewater naturally flows down through the anoxic tank 10 (10b), the aerobic tank 20 (20b), the anoxic tank 10 (10c), the aerobic tank 20 (20c), and the anoxic tank 10 (10d), and the aerobic tank 20 (20d) in this order.

Since the air lift pump AP is provided in the anoxic tank 10, compared with such a case in which the air lift pump AP is provided in the aerobic tank 20 so as to flow the liquid into the anoxic tank 10, the dissolved oxygen amount DO in the anoxic tank 10 does not increase.

In the present embodiment, four pairs of biological treatment units are arranged in an endless manner along the flow of the organic wastewater, and the aerobic tank 20 (20d) disposed on the most downstream side and the anoxic tank 10 (10a) disposed on the most upstream side are arranged side by side with a partition wall interposed therebetween. The sludge return path for returning the activated sludge in the most downstream aerobic tank 20 (20d) to the most upstream anoxic tank 10 (10a) is formed in a portion of the partition wall.

A partition wall W1 is formed between the anoxic tank 10 and the aerobic tank 20, and a cutout 11 (see FIG. 1B) is provided on a part of an upper end side of the partition wall W1, such that the organic wastewater containing the activated sludge from the anoxic tank 10 overflows into the aerobic tank 20.

A partition wall W2 is formed between the aerobic tank 20 and the anoxic tank 10, and an outflow port 21 for the organic wastewater containing the activated sludge is provided at a position corresponding to the vicinity of the bottom of the membrane separation device 30 in the vertical direction. An upper end of the opening which serves as the outflow port 21 is submerged, and is disposed at or lower than 30 cm from the water surface of the aerobic tank 20.

An outflow rate of the activated sludge from the outflow port 21 is set equal to or smaller than 0.5 msec. The outflow port 21 formed in the aerobic tank 20 (20d) on the most downstream side serves as the sludge return path described above. In FIG. 1A, an arrow shown with a two-dot chain line illustrates a circulating flow formed by the activated sludge flowing within the biological treatment unit.

The membrane separation device 30 includes a plurality of membrane elements 31 and an aeration device 32 installed below the membrane elements 31 (see FIG. 1B). The plurality of membrane elements 31 are accommodated in a casing by arranging them in up-and-down two stages with a predetermined interval such that each membrane surface has an upright posture.

Figure 2:
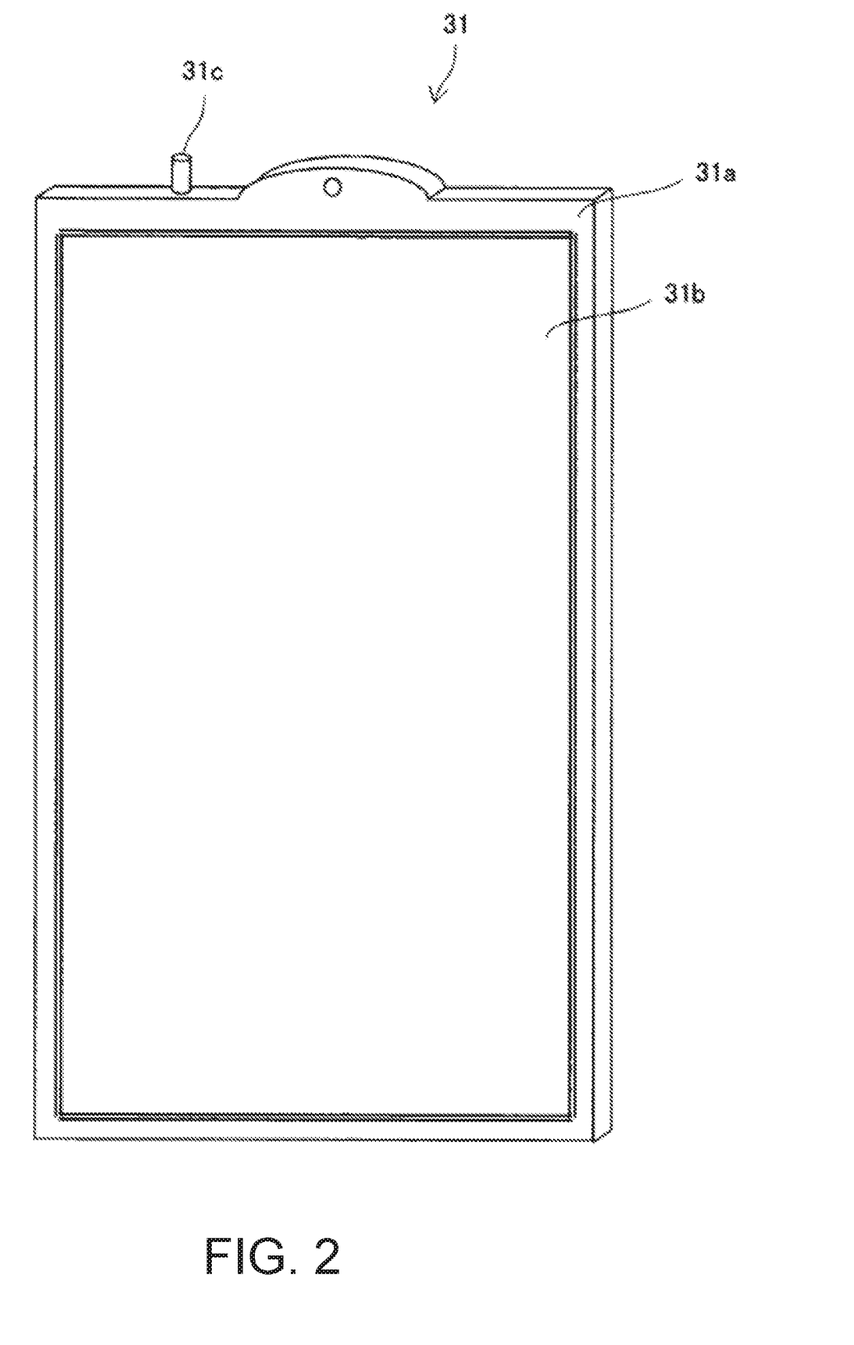
FIG. 2 is an explanatory diagram illustrating a membrane element provided in the membrane separation device.

As shown in FIG. 2, the membrane element 31 is formed by disposing a separation membrane 31b on both of the front and back surfaces of a resin membrane support 31a which has a water collecting pipe 31c at an upper portion thereof. In the present embodiment, the separation membrane 31b is formed of a microfiltration membrane including a porous organic polymer membrane having a nominal pore diameter of about 0.4 μm and provided on a surface of a nonwoven fabric.

The types of the separation membrane 31b and the membrane element 31 are not limited to the above-described embodiments, but any type of separation membrane and any form of membrane element (hollow fiber membrane element, tubular membrane element, monolith membrane element, etc.) can be used.

The treated water which has permeated the separation membrane 31b flows along a groove formed in the membrane support 31a into a water collecting pipe 31c. Then, as shown in FIGS. 1A and 1B, the treated water is sent from the water collecting pipe 31c to an air separation tank 35 via a respective header pipe 34, and then is collected into a treated water tank 37 through a liquid transfer pipe 36 connected to the air separation tank 35.

The header pipes 34 are provided with respective valves V5, V6, V7, and V8 for a flow rate adjustment, and a liquid transfer pipe 36 is provided with a suction pump P. The amount of permeated water from each membrane separation device 30 is adjusted by a pressure control with the suction pump P and an opening control with the valves V5, V6, V7, and V8.

In order to detect the transmembrane pressure difference of the membrane separation device 30, a pressure sensor Pm is provided to an upstream side of each of the valves V5, V6, V7, and V8 in the respective header pipes 34. In the figures, a reference symbol M indicates a motor for adjusting the opening of the valves. A treated water discharge path is formed by a path of the wastewater flowing from the water collection pipe 31c through the header pipe 34 into the air separation tank 35, from the air separation tank 35 through the liquid transfer pipe 36 connected thereto, into a treated water tank 37 where the treated water is collected.

Figure 1C:
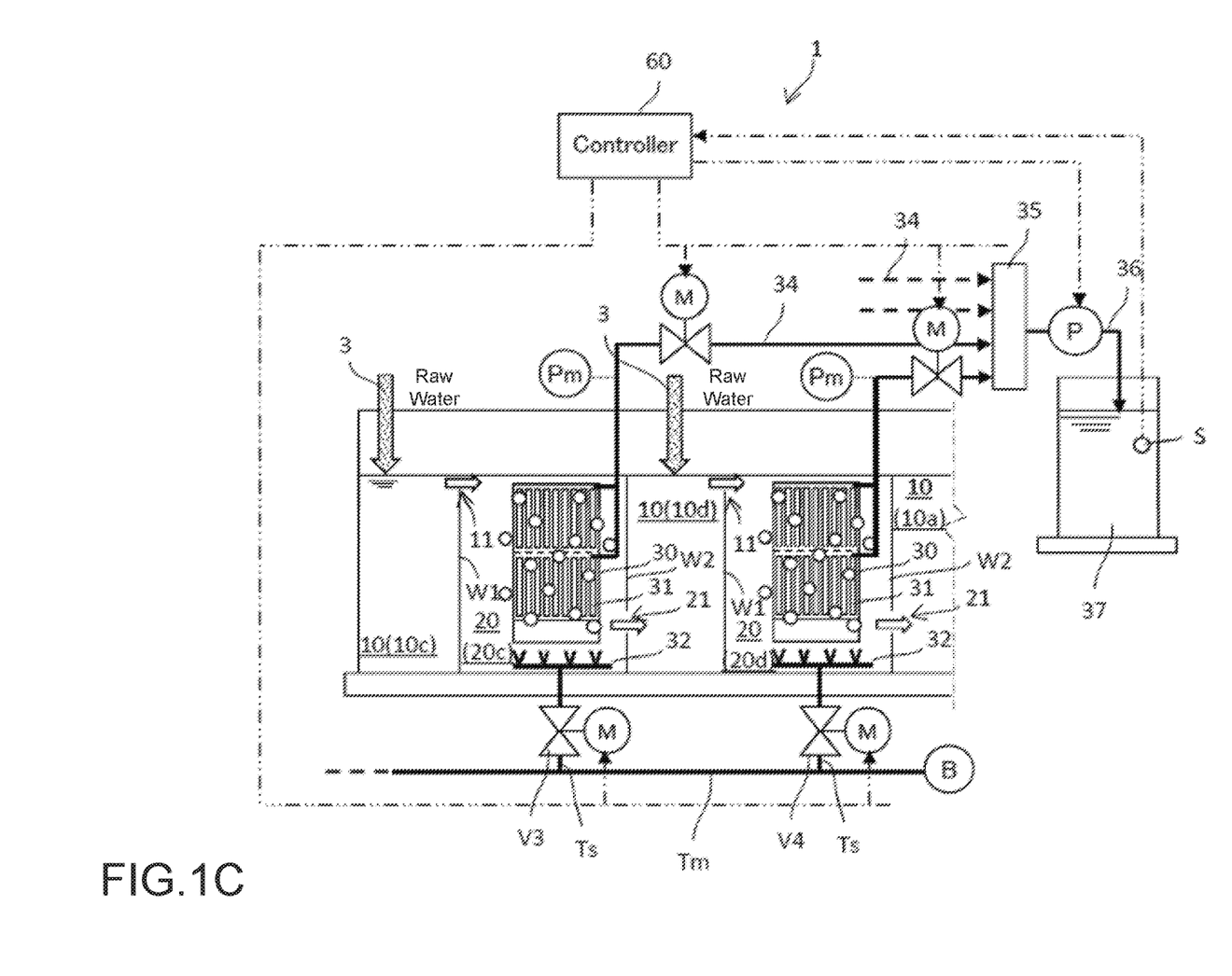
FIG. 1C is an explanatory sectional view of another part of the wastewater treatment device according to the present invention.

A main blow tube Tm is connected to the blower B, and four secondary blow tubes Ts are branched from the main blow pipe Tm, and a respective aeration device 32 is connected to each secondary blow tube Ts, as shown in FIGS. 1B and 1C. Correspondingly to the membrane separation devices 30 installed in the respective aerobic tanks 20, valves V1, V2, V3, and V4 are respectively provided to the secondary blow tubes Ts for a flow rate control, whereby an aeration amount, stopping and starting of the aeration are controlled.

The organic wastewater is aerated together with the activated sludge in the aerobic tank 20 by an auxiliary air diffuser 40, whereby the organic substance is decomposed and ammonia nitrogen is nitrified to nitrate nitrogen, and part of the organic wastewater is solid-liquid separated by the membrane separation device 30 into the treated water. The organic wastewater that has been nitrified in the aerobic tank 20 flows, together with the activated sludge, into the adjacent anoxic tank 10 on the downstream side, in which a denitrification process proceeds to remove nitrate nitrogen by reducing into nitrogen gas.

Suppose an inflow amount of the raw water per unit time is Q, and an inflow amount of the raw water into each anoxic tank 10 is Q/4, and when a total amount Q of permeated liquid is extracted from each membrane separation device 30 as the treated water, and an amount 3Q of the activated sludge in the aerobic tank 20 (20d) at the most downstream side is returned to the anoxic tank 10 (10a) at the most upstream side via the sludge return path, a substantial circulation ratio of the sludge becomes 3×4 so as to realize a high circulation ratio of 12Q. This makes it possible to reduce a tank capacity while maintaining the substantial sludge residence time SRT sufficiently high in each tank.

The organic wastewater treatment device 1 is provided with a flow meter for measuring an amount of inflow of the organic wastewater, a liquid level meter for measuring a tank water level of the biological treatment tank, a pressure sensor for measuring the transmembrane pressure difference of each membrane separation device, and a plurality of measuring instruments such as a measurement device S provided to the treated water tank 37 for measuring the T-N concentration and the $NH_3$—N concentration of the treated water.

The organic wastewater treatment device 1 further includes a control unit 60 which serves as a controller for controlling operations of the organic wastewater treatment device 1 based on the values measured by these measuring instruments. The control unit 60 is implemented in a control panel with a computer including an arithmetic circuit, an input circuit, an output circuit, and the like.

The control unit 60 controls the operation of each membrane separation device 30, while monitoring the measured values from these measuring instruments, such as a degree of the inflow amount of the raw water, the water level of the biological treatment tank 2, the value of each pressure sensor Pm, and the value of the measurement device S provided to the treated water tank 37 for measuring the total nitrogen (T-N) concentration, such that a filtration operation state and a relaxation operation state are repeatedly performed as the two operation modes.

The filtration operation state refers to a state in which the membrane-permeated water is drawn from the water collecting pipe 31c as the treated water while aeration is performed by the aeration apparatus 32. The relaxation operation state refers to a state in which a surface of the separation membrane 31b is cleaned by an upward flow which is generated by aeration bubbles from the aeration device 32, while the valves provided to the header pipe 34 are closed or the suction pump P is closed. The control unit 60 alternately repeats the filtration operation for a first predetermined time period (for example, 9 minutes) and the relaxation operation for a second predetermined time period (for example, 1 minute).

Furthermore, the control unit 60 determines whether to stop the membrane separation device 30 which is being operated or whether to start the membrane separation device 30 which has been stopped for each biological treatment unit, based on at least one of the inflow amount of organic wastewater, the water level of the biological treatment tank, the transmembrane pressure difference of each membrane separation device, the T-N concentration of the treated water, and the $NH_3$—N concentration of the treated water which are measured by the measuring instruments as an index.

For example, the control unit 60 determines a level of the nitrogen concentration in the raw water based on the total nitrogen concentration of the treated water, and if it is determined that the nitrogen concentration in the raw water is high, i.e., the processing load is high, the control unit 60 maintains the membrane separation device 30 in an operating state such that a predetermined amount of permeated water is obtained.

When the control unit 60 determines that the nitrogen concentration of the raw water is low, i.e., the processing load is low, the control unit 60 controls to stop the membrane separation device 30 in the biological treatment unit. For example, the membrane separation device 30 installed in any one of the aerobic tanks 20a, 20b, 20c, and 20d is stopped. The number of the membrane separation devices 30 to be stopped is set by the processing load. Therefore, two or more membrane separation devices 30 may be stopped at the same time.

A stop of the membrane separation device 30 means a state in which the aeration device 32 and the auxiliary aeration device 40 are stopped and the membrane permeation is also stopped. The aeration is stopped by shutting down corresponding one of the valves V1 to V4, and the membrane permeation is stopped by shutting down corresponding one of the valves V5 to V8.

Figure 3A:
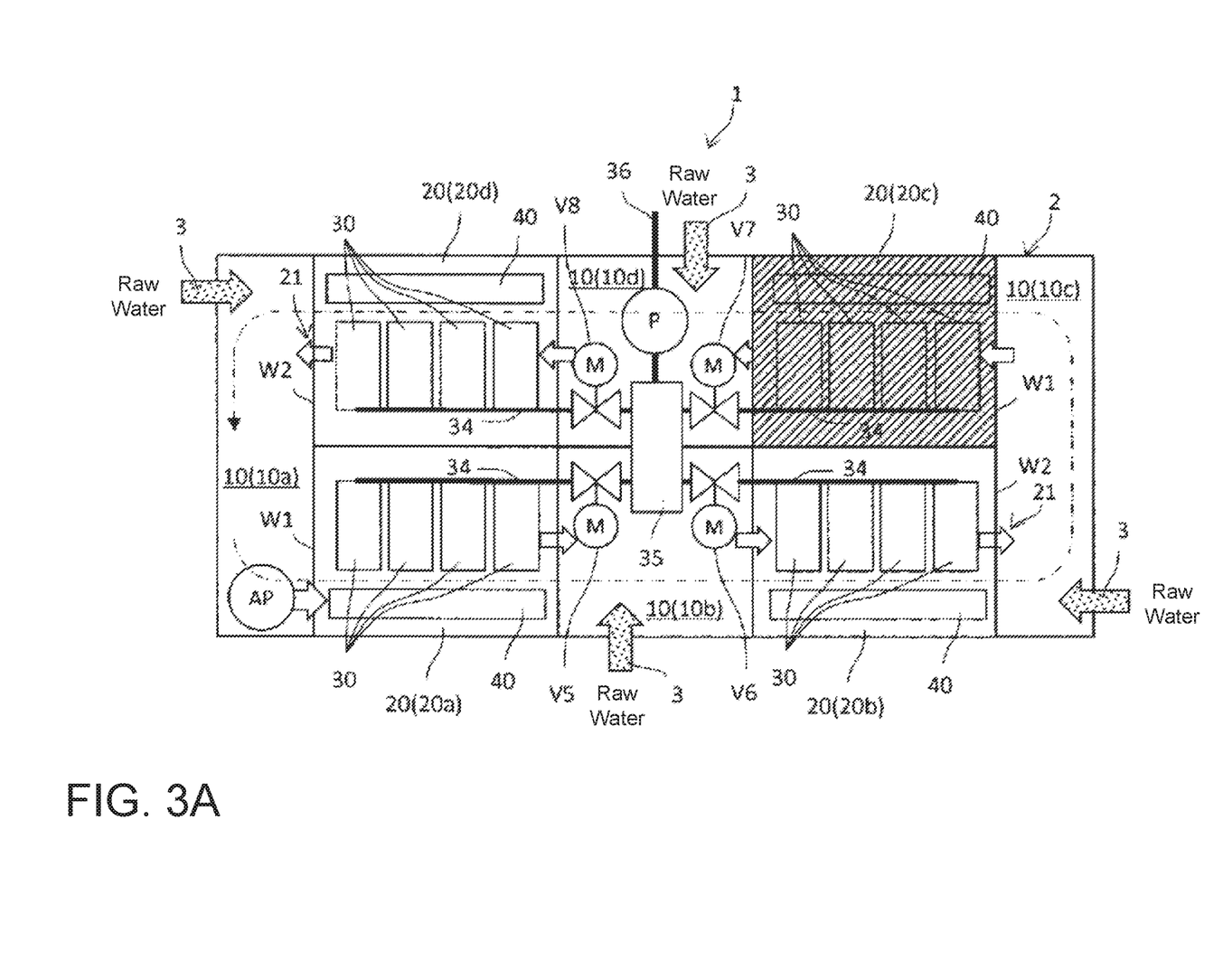
FIG. 3A is an explanatory diagram illustrating the wastewater treatment method according to the present invention, in which the membrane separation device at the upper right is stopped.
Figure 3B:
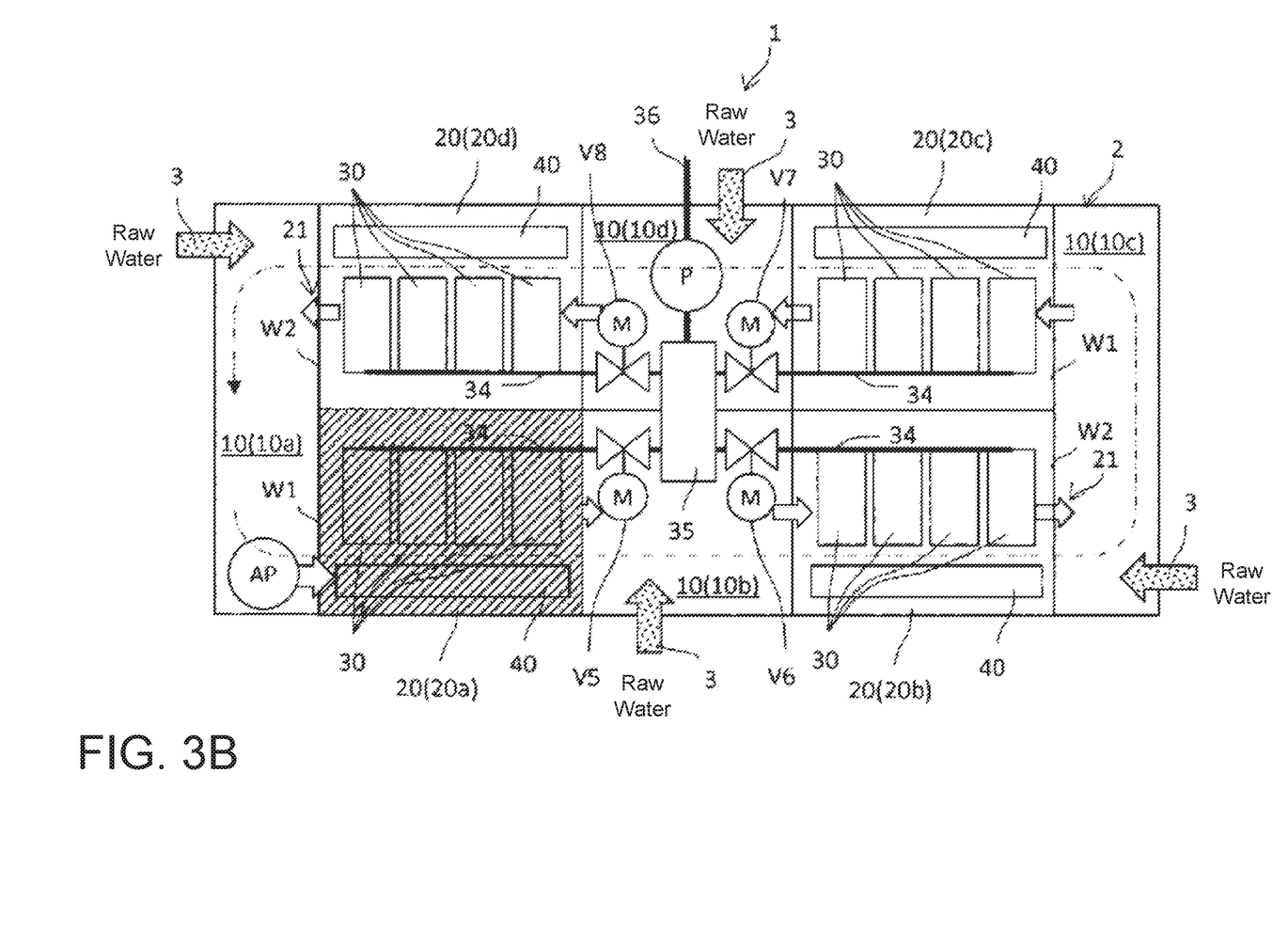
FIG. 3B is an explanatory diagram illustrating an operation state in which the membrane separation device at the lower left is stopped.

As shown in FIG. 3A, the hatched aerobic tank 20c indicates that the membrane separation device 30 therein has been stopped, and in FIG. 3B, the hatched aerobic tank 20a indicates that the membrane separation device 30 therein has been stopped.

The control unit 60 is configured to control such that, when it determines that one of the membrane separation devices 30 is to be stopped, the membrane separation device subject to a stop is switched in every predetermined time period.

For example, when the membrane separation device 30 in one of the aerobic tanks 20 should be stopped, the membrane separation device 30 to be stopped is switched every cycle or every several cycles of the filtration operation and the relaxation operation described above. In addition, although it is preferable that the switching is synchronized with the cycle of the filtration operation and relaxation operation, the switching can also be performed asynchronously to the cycle of the filtration operation and relaxation operation.

For example, in one switching mode, an operating state as shown in FIG. 3A is switched to that of FIG. 3B. The number of the membrane separation devices 30 to be stopped is not limited to one, but two or more membrane separation devices 30 may be stopped, though at least one of the membrane separation devices 30 needs to be operated.

Figure 4A:
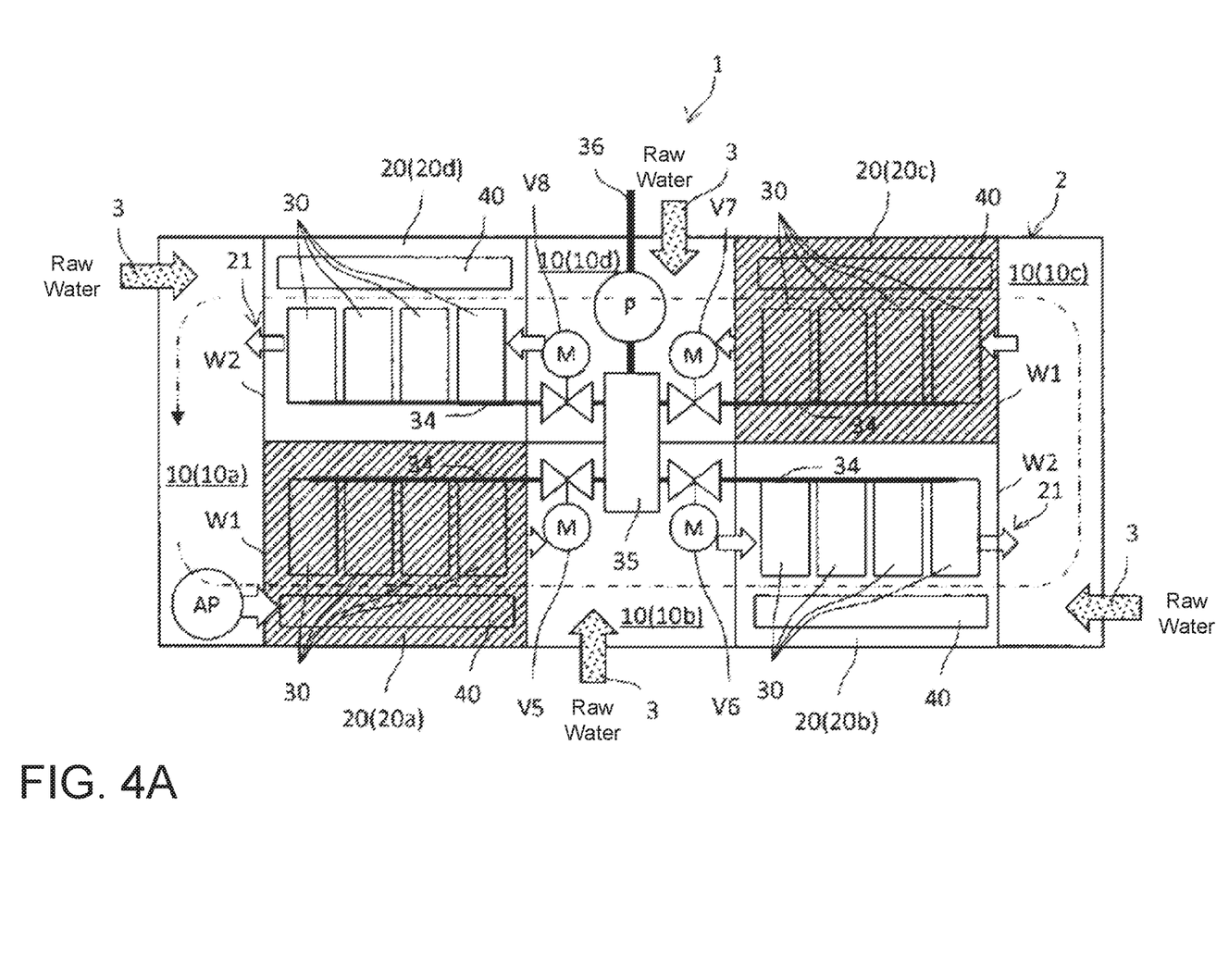
FIG. 4A is an explanatory diagram illustrating the wastewater treatment method according to the present invention, in which the membrane separation devices at the upper right and lower left are stopped.
Figure 4B:
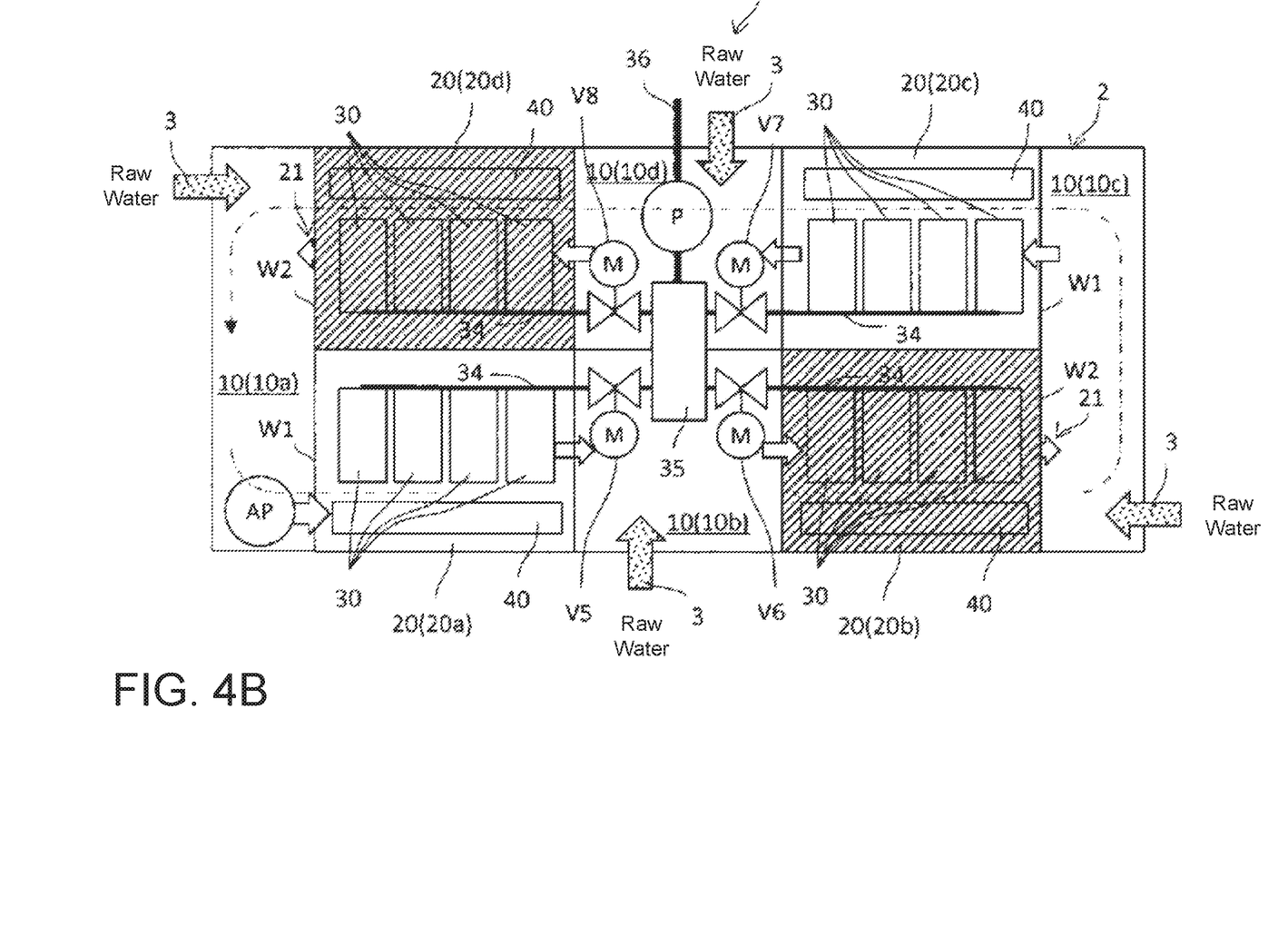
FIG. 4B is an explanatory diagram illustrating an operation state in which the membrane separation devices at the upper left and the rower right are stopped.

For example, if two of the membrane separation devices 30 are to be stopped in this embodiment, the two membrane separation devices 30 can be switched together as a unit, synchronized with the cycle of the filtration operation and relaxation operation. That is, an operation state of FIG. 4A and that of FIG. 4B are alternately switched in such a switching mode.

When the membrane separation device 30 is stopped by determining that the processing load would be reduced based on the index as described above, if a specific membrane separation device 30 is stopped for a prolonged period of time, there might be a risk of spoiling the sludge in the corresponding aerobic tank 20.

Even in such a case, by switching the membrane separation device 30 subject to a stop in every predetermined time period, it is possible to appropriately perform biological treatment as the entire device without spoiling the sludge in the specific aerobic tank.

If the inflow amount of the organic wastewater is used as the index, a degree of the processing load can be determined based on the quantity of the inflow. If the tank water level is used as the index, the processing load is determined to be low when the tank water level is low.

If the transmembrane pressure of each membrane separation device is adopted as the index, it is determined from a low transmembrane pressure which means that the processing load is low and thus the filtration efficiency is high, that it is not necessary to operate all of the membrane separation devices 30, while it is determined from an increased transmembrane pressure that it is necessary to start operating the membrane separation device 30 which has been stopped.

If the T-N concentration or the $NH_3$—N concentration of the treated water is used as the index, a degree of denitrification load can be determined, and it is determined from a lower concentration that it is not necessary to operate all the membrane separation devices 30, while it is determined from a higher concentration that it is necessary to start operating the membrane separation device 30 which has been stopped.

Furthermore, the control unit 60 is configured to adjust an injection amount of a flocculant injected into the activated sludge in the biological treatment tank 2 based on the operation status of the membrane separation device 30.

When the membrane separation device 30 in the biological treatment unit is stopped, the aerobic state in the corresponding aerobic tank 20 is strengthened because the aeration device 32 therein is stopped. When the activated sludge in this condition flows into the adjacent anoxic tank 10 on the downstream side, a discharge of phosphorus from the activated sludge becomes prominent due to the influence of the organic wastewater supplied to the anoxic tank 10.

Then, an excessive intake of phosphorus by the activated sludge in the aerobic tank 20 in which the membrane separation device 30 is being operated is enhanced. Thus, even if the injection amount of the flocculant is reduced, the phosphorus is removed efficiently, whereby it becomes possible to perform an advanced treatment with an efficient removal of phosphorus in addition to the denitrification process.

Since the upper end of the opening 21 of the outflow port of the aerobic tank 20 is submerged and is disposed at a position at or lower than 30 cm from the water surface of the aerobic tank 20, even if the membrane separation device 30 in the corresponding aerobic tank 20 is stopped and the activated sludge is not stirred up, the activated sludge is still securely sent to the anoxic tank on the downstream side.

In addition, even when the membrane separation device 30 is in an operating state, since the concentration of the dissolved oxygen DO in the vicinity of the bottom of the membrane separation device 30 is lower than that in the vicinity of the liquid surface, it also suppresses an increase in the concentration of the dissolved oxygen in the anoxic tank 10 on the downstream side.

Furthermore, if the inflow velocity of the activated sludge is set equal to or smaller than 0.5 m/sec., a water level difference between the aerobic tank and the anoxic tank due to the inflow of the activated sludge can be suppressed, whereby uniformity in the aeration of the activated sludge in the aerobic tank is enhanced. A cutout 11 is so configured that the inflow velocity of the activated sludge is 0.5 msec. or less, and an amount of air supplied to the air lift pump AP is adjusted.

The control unit 60 described above executes an organic wastewater treatment method which includes dividing and supplying the organic wastewater to the anoxic tank in each biological treatment unit, biologically treating the organic wastewater by repeating a denitrification process in the anoxic tank and a nitrification process in the aerobic tank, discharging the membrane-permeated liquid from the membrane separation device in each biological treatment unit as the treated water, and determining for each biological treatment unit whether to stop the membrane separation device which is operating, or whether to start the membrane separation device which has been stopped, based on at least one of an inflow amount of the organic wastewater, a tank water level, a transmembrane pressure difference of each membrane separation device, a T-N concentration of the treated water, and an NH3-N concentration of the treated water as an index.

In addition, an injection amount of the flocculant injected into the activated sludge in the biological treatment tank is adjusted according to the operation status of the membrane separation device.

When it is determined that one of the membrane separation devices is to be stopped, the membrane separation device subject to a stop is switched in every predetermined time period.

Furthermore, the organic wastewater treatment method is executed such that a membrane cleaning process is sequentially performed for all of the membrane separation devices by injecting a cleaning liquid to the stopped membrane separation device from a secondary side thereof, while a membrane filtration flow rate for the membrane separation devices which have been cleaned is set equal to or smaller than that of the membrane separation devices which have not been cleaned until all of the membrane separation devices have been cleaned.

Each of the above-described embodiments is an example of the present invention, and the present invention is not limited by the description. The specific configuration of each part can be appropriately changed and designed within the range where the effects of the present invention are exhibited. In addition, one or more of the above-described embodiments may be appropriately combined with one another.

What is claimed is:

1. An organic wastewater treatment method for biologically treating nitrogen-containing organic wastewater in activated sludge using an organic wastewater treatment device provided with (a) a biological treatment tank in which a plurality of biological treatment units are connected in series, each biological treatment unit having a pair of anoxic tanks disposed on an upstream side along a flow of the organic wastewater, and an aerobic tank disposed on a downstream side of the flow, a membrane separation device being immersed in activated sludge in the aerobic tank, and (b) a sludge return path for returning the activated sludge from the aerobic tank disposed on a most downstream side to the anoxic tank disposed on a most upstream side, the method comprising:

dividing and supplying the organic wastewater to the anoxic tank of each biological treatment unit;

biologically treating the organic wastewater by repeating a denitrification process in the anoxic tank and a nitrification process in the aerobic tank;

discharging membrane-permeated liquid from the membrane separation devices of each biological treatment unit as treated water; and determining for each biological treatment unit whether to stop the membrane separation device which is operating, or whether to start the membrane separation device which has been stopped, based on at least one of an inflow amount of the organic wastewater, a tank water level, a transmembrane pressure difference of each membrane separation device, a T-N concentration of the treated water, and an $NH_3$—N concentration of the treated water as an index.

2. The organic wastewater treatment method according to claim 1, further comprising:

adjusting an injection amount of a flocculant injected into the activated sludge in the biological treatment tank in accordance with an operating status of the membrane separation devices.

3. The organic wastewater treatment method according to claim 1, wherein when it is determined to stop one of the membrane separation devices, the membrane separation device subject to a stop is switched in every predetermined time period.

4. The organic wastewater treatment method according to claim 3, further comprising:

sequentially performing a membrane cleaning process for all of the membrane separation devices by injecting a cleaning liquid to the stopped membrane separation device from a secondary side thereof, wherein a membrane filtration flow rate of the membrane separation devices which have been cleaned is set equal to or smaller than that of the membrane separation devices which have not been cleaned until all of the membrane separation devices have been cleaned.

5. The organic wastewater treatment method according to claim 1, wherein an upper end of an opening of an outflow port through which the activated sludge flows from the aerobic tank into the anoxic tank is submerged, and an inflow rate of the activated sludge is equal to or smaller than 0.5 m/sec.

6. An organic wastewater treatment device for biologically treating nitrogen-containing organic wastewater in activated sludge, the device comprising;

a biological treatment tank in which a plurality of biological treatment units are connected in series, each biological treatment unit having a pair of anoxic tanks disposed on an upstream side along a flow of the organic wastewater, and an aerobic tank disposed on a downstream side of the flow, a membrane separation device being immersed in activated sludge in the aerobic tank;

a sludge return path configured to return the activated sludge from an aerobic tank disposed on a most downstream side to an anoxic tank disposed on a most upstream side;

a raw water supply path configured to divide and supply the organic wastewater to the anoxic tank of each biological treatment unit;

a treated water discharge path configured to discharge membrane-permeated liquid from the membrane separation devices of each biological treatment unit as treated water;

a measurement device configured to measure at least one of an inflow amount of the organic wastewater, a tank water level, a transmembrane pressure difference of each membrane separation device, a T-N concentration of the treated water, and an NH3-N concentration of the treated water; and a controller configured to determine for each biological treatment unit whether to stop the membrane separation device which is operating or whether to start the membrane separation device which has been stopped based on a value measured by the measurement device as an index.

7. The organic wastewater treatment device according to claim 6, wherein the controller is configured to adjust an injection amount of a flocculant injected into the activated sludge in the biological treatment tank in accordance with an operating status of the membrane separation device.

8. The organic wastewater treatment device according to claim 6, wherein when it is determined to stop one of the membrane separation devices, the controller switches the membrane separation device subject to a stop in every predetermined time period.

9. The organic wastewater treatment device according to claim 6, wherein an upper end of an opening of an outflow port for sending the activated sludge from the aerobic tank to the adjacent anoxic tank on a downstream side along a flow of the organic wastewater is positioned at or lower than 30 cm from a water surface of the aerobic tank.

* * * * *